United States Patent [19]

Skarvada

[11] 4,425,621
[45] Jan. 10, 1984

[54] SPIN-UP DETECTION APPARATUS FOR BRAKE CONTROL SYSTEM

[75] Inventor: Thomas Skarvada, Woodland Hills, Calif.

[73] Assignee: Crane Co., Chicago, Ill.

[21] Appl. No.: 176,348

[22] Filed: Aug. 8, 1980

[51] Int. Cl.³ .............................................. G06F 16/20
[52] U.S. Cl. ..................................... 364/426; 303/93; 303/96; 303/103
[58] Field of Search ......................... 303/93, 96, 103; 364/426

[56] References Cited

U.S. PATENT DOCUMENTS 3,919,537 11/1975 Byrnum ............................. 235/183
4,022,513 5/1977 Hirzel et al. .
4,184,203 1/1980 Skarvada .
4,298,940 11/1981 Tadokoro et al. .................. 364/426

Primary Examiner—J. V. Truhe
Assistant Examiner—Saul M. Bergmann
Attorney, Agent, or Firm—Willian, Brinks, Olds, Hofer, Gilson & Lione Ltd.

[57] ABSTRACT

A spin-up detection apparatus for a brake control system operates to monitor a wheel speed signal indicative of the rotational velocity of a wheel until the wheel speed signal exceeds an absolute velocity threshold. Once this threshold is exceeded, the apparatus then monitors the rate of change of the wheel speed signal. When this rate of change falls below a predetermined level, a control signal is generated to indicate that wheel spin-up is substantially complete.

13 Claims, 3 Drawing Figures

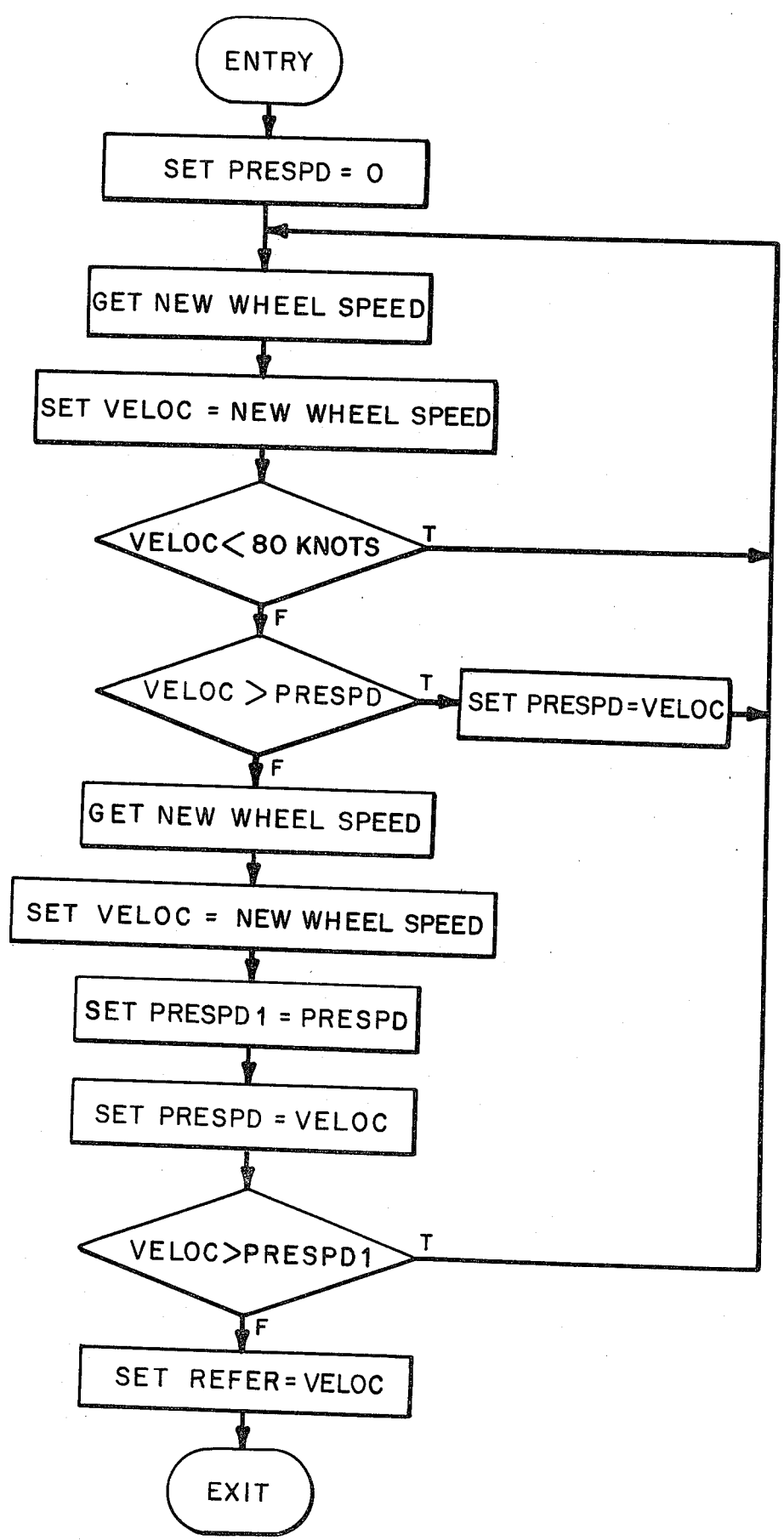

SPIN-UP DETECTION APPARATUS FOR BRAKE CONTROL SYSTEM

BACKGROUND OF THE INVENTION

The present invention is directed to an improved apparatus for detecting wheel spin-up in a brake control system.

Vehicles such as modern jet transports are provided with sophisticated braking systems, which commonly include anti-skid control systems as well as automatic braking systems. U.S. Pat. No. 4,022,513, which issued May 10, 1977 to Edgar A. Hirzel and Robert D. Cook and is assigned to the assignee of the present invention, discloses one such brake control system. This system operates automatically to apply brake pressure to initiate braking action during landing immediately following aircraft touchdown. This patent is hereby incorporated by reference for its discussion of the general background of one such automatic braking system.

An important consideration in automatic braking systems is that the brakes should not be applied until after the wheels have approximately reached synchronous speeds. If the brakes are prematurely applied before the wheels have spun-up to nearly synchronous speed, tires can be severely damaged by the resulting skids. In the past, one approach to this problem has been to provide a velocity threshold, such that the brakes are not applied until after the wheel has spun-up beyond a predetermined velocity.

The use of a velocity threshold to indicate that wheel spin-up is substantially complete brings with it certain disadvantages. First, a fixed threshold velocity cannot take into account differences due to variations in landing speeds. It is common for landing speeds to vary within a range of twenty knots or more during routine service. A single fixed threshold velocity appropriate for landings in the lower range of landing velocities will prematurely indicate that wheel spin-up is substantially complete during a fast landing. This will result in the automatic braking system prematurely applying brakes before the wheel has accelerated to substantially synchronous velocity, which may in turn result in excessive wheel skids.

SUMMARY OF THE INVENTION

The present invention is directed to an improved apparatus for detecting wheel spin-up in a brake control system which avoids these and other disadvantages of the prior art.

According to this invention, a brake control system is provided with means for comparing a signal indicative of wheel acceleration to a threshold. When this threshold is crossed, indicating that wheel acceleration has fallen below the threshold value, then a control signal is generated which is then supplied to the brake control system.

In the preferred embodiment, the brake control system is an automatic braking system which waits until the control signal is generated prior to initiating brake application. By actually responding to the measured dynamic behavior of the wheel rather than to any preset velocity threshold, the present invention adapts automatically both to fast landings and to slow landings, to generate the control signal at the appropriate time. In this way excessive initial wheel skids can be substantially avoided.

Furthermore, the present invention can be readily implemented as a programmed microprocessor. Thus, the present invention is well suited for application either with conventional analog circuit systems or with digital brake control systems.

The invention itself, together with further objects and attendant advantages, will be best understood by reference to the following detailed description taken in connection with the accompanying drawings.

BRIEF DESCRIPTION OF THE DRAWINGS

FIG. 3 is a detailed flowchart showing the organization of the wheel spin-up routine of FIG. 2.

DETAILED DESCRIPTION OF A PREFERRED EMBODIMENT

Figure 1:
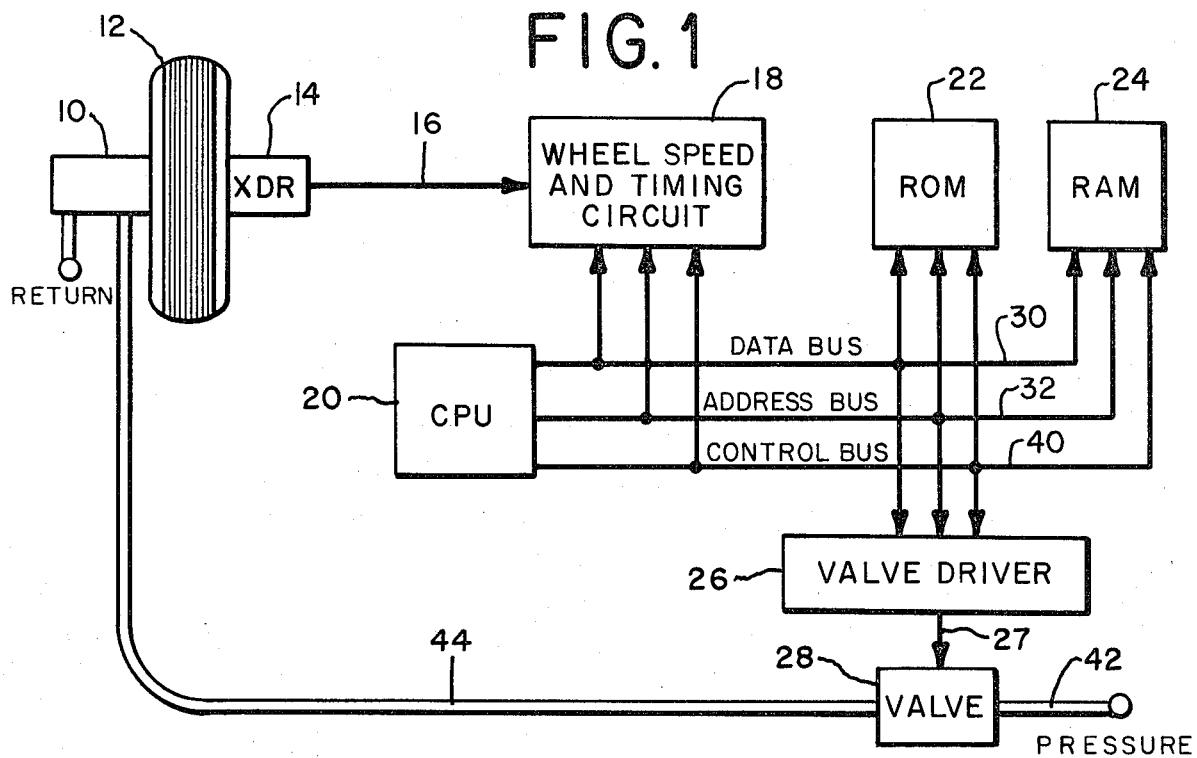
FIG. 1 is a block diagram of an automatic braking systems including a CPU programmed to implement a preferred embodiment of the present invention.

Referring now to the drawings, FIG. 1 provides a block diagram of an automatic braking system which includes a preferred embodiment of the present invention. This system includes a rotatable wheel 12 which is braked by a hydraulic brake 10. A wheel speed transducer 14 is mounted to the wheel 12, and operates to produce a wheel speed signal on line 16. This wheel speed signal is a sinusoidal signal, having a frequency directly proportional to the rotational velocity of the wheel 12. In this preferred embodiment, the wheel 12 includes a tire having a diameter of forty inches, and the transducer 14 is a variable reluctance device having fifty teeth, such that the transducer produces a wheel speed signal having a frequency fifty times the rotational frequency of the wheel 12.

The wheel speed signal on line 16 is applied as an input to a wheel speed and timing circuit 18. This circuit 18 is described in detail in U.S. Pat. No. 4,184,203, which issued Jan. 15, 1980 to Thomas Skarvada and is assigned to the assignee of the present invention. U.S. Pat. No. 4,184,203 is hereby incorporated by reference in this specification. As explained in this patent, the wheel speed and timing circuit 18 operates to measure the period of the wheel speed signal on line 16. This circuit 18 is coupled to a central processing unit (CPU) 20, a read only memory 22, a random access memory 24, and a valve driver 26 via a data bus 30, an address bus 32, and a control bus 40. The valve driver 26 operates to generate a valve control signal on line 27 which is applied as a control signal to a hydraulic valve 28. This valve 28 operates to modulate the hydraulic pressure transmitted from the line 42 via the line 44 to the brake 10.

The automatic brake control system of FIG. 1 is implemented as a programmed CPU 20 which executes the program listed in Table 1. Preferably, the CPU 20 is a Z-80 CPU marketed by Zilog, Inc., Cupertino, Calif. The program listing of Table 1 is presented in assembly language suitable for execution by the Z-80 CPU.

Figure 2:
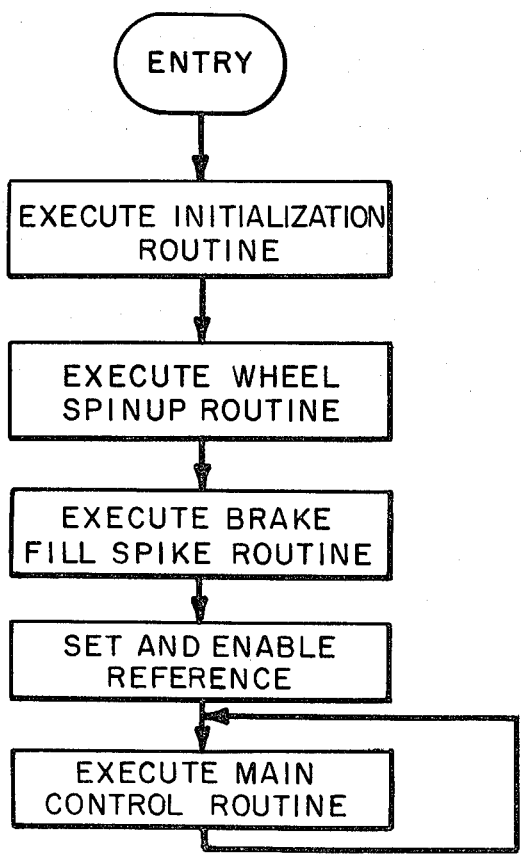
FIG. 2 is a flowchart showing the general organization of the program of the CPU of FIG. 1.

FIG. 2 presents a generalized flowchart showing the organization of the program of Table 1. This program begins by first executing an initialization routine. This initialization routine corresponds to statements number 6 through 32 and 328 through 418 of Table 1. This initialization routine initializes certain flags and other variables in computer memory and configures the ports of the wheel speed and timing circuit 18. U.S. Pat. No.

4,184,203 includes a detailed description of the operation of the port set-up routine.

Following initialization, the program then executes the wheel spin-up routine shown in statements number 33 through 66 of Table 1. In this routine, the program waits until the wheel speed signal has not increased in three consecutive measurements. This condition is taken as an indication that wheel spin-up is substantially complete. The operation of the wheel spin-up routine will be described in detail below in connection with FIG. 3.

After wheel spin-up is substantially complete, the brake fill spike routine is executed and the reference is set and enabled. The brake fill spike routine controls the valve 28 to pass a predetermined amount of hydraulic fluid to the brake 10 to prepare the brake for active use without actually initiating any substantial braking action. These routines are listed in statements number 67–95 of Table 1.

After the brake fill spike routine has been executed and the referennce has been set and enabled, control is then transferred to the main control routine. This routine is listed in statements number 96 through 160. This routine compares measured wheel speed with a reference speed and adjusts the brake control signal supplied via line 27 to the valve 28 to adjust the braking action to maintain measured wheel speed substantially equal to the reference velocity.

The wheel spin-up routine and the main control routine both utilize the velocity measurement routine listed in statements number 161 through 221 of Table 1, as well as the divide routine listed in statements 222 through 274 of Table 1. The operation of the velocity measurement routine is described in detail in the above-referenced U.S. Pat. No. 4,184,203.

In addition, the main control routine utilizes the velocity reference which is generated by the velocity reference routine listed in statements 275 through 327 of Table 1. This velocity reference routine decrements the velocity reference at a rate which increases both a fixed rate component and a variable rate component. The fixed rate component sets the average rate of change of the velocity reference, while the variable rate component takes on either a positive or a negative value as necessary to prevent the difference between measured wheel speed and the velocity reference from becoming excessive.

Turning now to FIG. 3, the wheel spin-up routine, which is listed at lines 33 through 66 of Table 1, is flow-charted in FIG. 3. As shown in FIG. 3, the wheel spin-up routine first sets the variable PRESPD to zero. Then a new wheel speed measurement is obtained and compared with a fixed value, which in this preferred embodiment is set to eighty knots. If the newly measured wheel speed is less than eighty knots, the program simply returns to get another wheel speed measurement. Thus, the program loops until the measured wheel speed exceeds eighty knots. This preferred embodiment is adapted for use with an aircraft having a minimum landing speed of about one hundred knots. In general, it is preferred to have the threshold velocity set at about twenty knots below the minimum landing speed. Once the wheel speed exceeds eighty knots, it is then compared with the value PRESPD. If the newly measured wheel speed is greater than PRESPD, then PRESPD is set equal to the newly measured wheel speed and the program returns to get another wheel speed measurement. This will continue throughout the period of wheel spin-up when the wheel is rapidly accelerating and each newly measured velocity will in general be greater than the previously measured velocity.

However, once wheel spin-up is substantially complete, the newly measured wheel speed will be equal to or less than the previously measured wheel speed. At this point, the program then measures the wheel speed yet another time, saves this new measurement, saves the current value of PRESPD, and compares the newly measured wheel speed with this value. If once again the newly measured velocity is less than or equal to the previously measured velocity stored in PRESPD, this is taken as an indication that the wheel spin-up is substantially complete. If, on the other hand, the newly measured velocity is greater than PRESPD, the program loops to once again obtain a new wheel speed measurement.

Two features of the program of FIG. 3 should be noted particularly. First, this program includes an absolute velocity test to reduce the incidence of malfunctions. Unless the wheel speed measurement exceeds a predetermined value, eighty knots in the above example, the remainder of the program is disabled. It is only after that the initial velocity threshold has been passed that the following test for wheel spin-up is made. As mentioned previously, the velocity threshold is preferably set at a value approximately twenty knots below the minimum anticipated landing speed.

A second feature of note is that the program of FIG. 3 insists that two consecutive measurements of the wheel speed be less than or equal to a previously stored measure of the wheel speed. By requiring that two consecutive tests be met, this program reduces the probability that an erroneous wheel speed measurement can falsely be taken as an indication that wheel spin-up is complete. In the corresponding listing of Table 1, the carry signal, which is tested in statement number 66, is effectively a control signal which is reset when wheel spin-up is substantially complete.

This preferred embodiment requires that no wheel speed increase be detected in three consecutive measurements of wheel speed. In this preferred embodiment, wheel speed is measured to a precision of one-tenth of a knot at the least significant bit. When the forty inch tire and the fifty tooth transducer described above are used in connection with an aircraft having a typical landing speed of about 120 knots, this corresponds to a requirement that the wheel acceleration must stay below an average value of about seven feet per second per second over a period of at least fifteen milliseconds after the wheel speed has exceeded eighty knots for the wheel spin-up process to be taken as substantially complete. During the initial stages of wheel spin-up, wheel acceleration is significantly greater than this value. It is only near the end of wheel spin-up that wheel acceleration falls within the range of seven feet per second per second. By comparing successive measurements of the wheel speed, the embodiment of FIG. 3 effectively compares the wheel acceleration to a threshold, and utilizes an acceleration below this threshold as an indication that wheel spin-up is substantially completed. The precise threshold utilized is not critical, for wheel acceleration during spin-up is significantly greater than it is once spin-up is substantially complete. Thus, the precise value used for the threshold can be varied widely.

From the foregoing, it should be apparent that an apparatus has been described which operates to detect the completion of wheel spin-up for use in initiating operation of an automatic braking brake control system. This apparatus provides an effective indication of wheel spin-up regardless of the precise landing speed, and it therefore reduces unnecessary wheel skids previously associated with high landing speeds.

Of course, it should be understood that various changes and modifications to the preferred embodiment described above will be apparent to those skilled in the art. The preferred embodiment described above is implemented as a programmed microprocessor which also provides a velocity based automatic braking system. The present invention can be used in braking systems implemented as analog circuitry as well as in digital braking systems, and it can be used in braking systems which are acceleration based rather than velocity based. Such changes and modifications can be made without departing from the spirit and scope of the present invention, and it is therefore intended that all such changes and modifications be covered by the following claims.

TABLE 1.

```
00003   ; AUTOBRAKE CONTROL LOOP
00004   ; ***************************
00005   ;
00006   BEG     ORG 0
00007           DI
00008           LD SP,STACK
00009           LD HL,INTAB
00010           LD A,H
00011           LD I,A
00012           LD B,4
00013   BEGX    LD HL,BEGY
00014           PUSH HL
00015           RETI
00016   BEGY    DJNZ BEGX
00017           JP SETUP
00018   RETNX   NOP
00019           NOP
00020           EI
00021           RETI
00022   ;
00023   START   LD SP,STACK
00024           LD HL,0
00025           LD (PRESPD),HL
00026           LD A,0
00027           LD (COMMX),A ; WHEEL SPEED STATUS
00028           LD (COMMZ),A ; REFERENCE STATUS
00029           LD A,0DDH ; DISABLE REFERENCE
00030           LD (COMMY),A
00031           IM 2
00032           EI
00033   ;
00034   ; WAIT FOR SPINUP
00035   ;
00036   SPINA   LD A,(COMMX) ; GET SPEED STATUS
00037           CP 0DDH
00038           JR NZ,SPINA ; WAIT UNTIL AVAILABLE
00039           XOR A
00040           LD (COMMX),A
00041           LD BC,(WHLSPD)
00042           CALL DIVIDX ; CONVERT INTO VELOCITY
00043           LD DE,(DATA) ; GET VELOCITY
00044           LD HL,KTS80
00045           XOR A ; CLEAR CARRY
00046           SBC HL,DE
00047           JR NC,SPINA ; LOOP UNTIL SPEED ABOVE 80 KTS
00048           LD HL,(PRESPD) ; GET OLD SPEED
00049           XOR A
00050           SBC HL,DE
00051           JR NC,SPINB
00052           LD (PRESPD),DE
00053           JR SPINA ; LOOP UNTIL STABLE
00054   SPINB   LD A,(COMMX)
00055           CP 0DDH
00056           JR NZ,SPINB
00057           XOR A
00058           LD (COMMX),A
00059           LD BC,(WHLSPD)
00060           CALL DIVIDX
00061           LD DE,(DATA)
```

```
00062           LD HL,(PRESPD); GET OLD SPEED
00063           LD (PRESPD),DE; SAVE NEW SPEED
00064           XOR A
00065           SBC HL,DE
00066           JR C,SPINA; LOOP IF STILL INCREASING
00067   ;
00068   ; BRAKE FILL SPIKE
00069   ; ****************
00070   ;
00071           LD A,FILLCUR; CURRENT FOR FILL SPIKE
00072           OUT (ANALOG),A
00073           LD A,FILLTIM; TIME CONSTANT
00074   SPINC   LD B,0
00075           DJNZ $
00076           DJNZ $
00077           DJNZ $
00078           DEC A
00079           JR NZ,SPINC
00080           LD A,14H; START WITH .8 MA CURRENT
00081           OUT (ANALOG),A
00082           LD (CURRENT),A
00083   ;
00084   ; SET AND ENABLE REFERENCE
00085   ; ************************
00086   ;
00087   SETREF  LD A,(COMMX)
00088           CP 0DDH
00089           JR NZ,SETREF
00090           LD BC,(WHLSPD)
00091           CALL DIVIDX
00092           LD HL,(DATA)
00093           LD (REFER),HL
00094           LD A,0
00095           LD (COMMY),A; ENABLE REFERENCE
00096   ;
00097   ; MAIN CONTROL LOOP
00098   ; *****************
00099   ;
00100   MAIN    LD SP,STACK
00101           IM 2
00102           EI
00103           LD A,(COMMZ)
00104           CP 0DDH; CHECK FOR NEW REFERENCE
00105           JR NZ,MAIN
00106           LD HL,(REFER); GET NEW REFERENCE
00107           LD DE,5
00108           XOR A
00109           SBC HL,DE
00110           JR NC,MAINA
00111           LD A,(CURRENT)
00112           INC A
00113           JR NZ,MAINA
00114   ;
00115   ; TEMPORARY LINK FOR TEST PURPOSES
00116   ;
00117           DI
00118           JP DELAY
00119   ;
00120   MAINA   XOR A
00121           LD (COMMZ),A; SET READ STATUS
00122           LD BC,(WHLSPD)
00123           CALL DIVIDX
00124   ;
00125   ; VALVE DRIVER CONTROL
00126   ; ********************
00127   ;
00128   ; VELOCITY IS COMPARED TO REFERENCE, POLARITY DETERMINES
00129   ; DIRECTION OF VALVE CURRENT CHANGE. NEW CURRENT IS ALWAYS
00130   ; SAVED IN (CURRENT) MEMORY.
00131   ; (COMMY) LOCATION IS SET AS FOLLOWS
00132   ; 1. "0" FOR NO CHANGE TO REFERENCE
00133   ; 2. "1" FOR INCREASE TO REFERENCE
00134   ; 3. "2" FOR DECREASE TO REFERENCE
```

```
00135  ; 4. "ODDH" FOR DISABLE REFERENCE UPDATE
00136  ;
00137  ; THIS IS INTERPRETED DURING REFERENCE UPDATE SUBROUTINE
00138  ; AND DETERMINES GAIN OF THE TOTAL CONTROL LOOP ALONG
00139  ; WITH VALUE OF "GAIN" (SEE REFERENCE UPDATE SUBROUTINE).
00140  ;
00141  DRIVER  LD DE,(DATA); GET REFERENCE
00142          LD HL,(REFER); OTHERWISE GET REFERENCE
00143          SCF; SET CARRY FLAG
00144          SBC HL,DE
00145          LD A,(CURRENT); GET PRESENT VALUE
00146          JR NC,DRIVEA; JUMP IF NEGATIVE CHANGE
00147          LD E,1; COMMAND TO INCREASE REFERENCE
00148          ADD A,1
00149          JR NC,DRIVEB; GOOD CURR
00150          LD A,0FFH; OTHERWISE LOAD MAX CURR
00151          JR DRIVED
00152  DRIVEA  LD E,2; COMMAND TO DECREASE REFERENCE
00153          SUB 1; REDUCE VALVE CURRENT
00154          JR NC,DRIVEB
00155          LD A,0
00156  DRIVEB  OUT (ANALOG),A
00157          LD (CURRENT),A; SAVE NEW CURRENT
00158          LD A,E; MOVE REFERENCE COMMAND
00159          LD (COMMY),A; AND SAVE
00160          JR MAIN; DONE, LOOP
00161  ;
00162  ; WHEEL VELOCITY MEASUREMENT
00163  ; **************************
00164  ;
00165  ; ENTRY HERE IS VIA VECTOR INTERRUPT. VELOCITY IS
00166  ; 16 BIT NUMBER.
00167  ; OPERATION: POSITIVE TRANSITION OF WHEEL XDCR
00168  ; CAUSES INTERRUPT AND THIS ROUTINE IS ENTERED.
00169  ; MOMMENTARY COUNT IN THE CTC CIRCUIT (TWO BYTES)
00170  ; IS READ AND STORRED IN "INSTIM" MEMORY, TWO BYTES.
00171  ; NEXT POSITIVE TRANSITION OF XDCR CAUSES ANOTHER ENTRY,
00172  ; COUNT IN CTC CIRCUIT IS READ IN, SUBTRACTED FROM
00173  ; PREVIOUS COUNT IN "INSTIM" AND DIFFERENCE COMPARED WITH
00174  ; MINIMUM VALUE TO OBTAIN GOOD RESOLUTION. IF VALUE IS TOO
00175  ; LOW, TOOTH COUNT IS INCREMENTED AND EXIT MADE WITHOUT
00176  ; NEW VELOCITY INFO. WHEN VALUE IS ABOVE THE MINIMUM,
00177  ; THE TOTAL DIFFERENCE IS USED TO CALCULATE VELOCITY
00178  ; ALONG WITH VALUE IN THE TOOTH COUNTER, WHICH IS THEN
00179  ; RESET FOR NEW MEASUREMENT.
00180  ; "COMMX" MEMORY IS SET TO ODDH TO INDICATE THAT NEW
00181  ; VELOCITY INFO IS AVAILABLE.
00182  ; "STATUS" IS USED AS A TOOTH COUNTER.
00183  ;
00184  WHEELSP DI; DISABLE INTERRUPTS
00185          PUSH AF
00186          PUSH HL
00187          PUSH DE
00188          PUSH BC
00189          LD C,CTC0
00190          IN A,(C); LOW BYTE
00191          INC C
00192          IN D,(C); HIGH BYTE
00193          SUB COMPEN
00194          LD E,A
00195          PUSH DE
00196          LD HL,(INSTIM)
00197          AND A; CLEAR CARRY
00198          SBC HL,DE; GET DIFFERENCE
00199          EX DE,HL; TIME INTO DE
00200          LD HL,SPD1; FIRST SCALE
00201          AND A
00202          SBC HL,DE
00203          LD HL,STATUS
00204          JR C,WHEELA; TIME ABOVE MINIMUM
00205          INC (HL); INCREMENT TOOTH COUNT
00206          POP DE; BALANCE STACK
00207          JR WHEELB
```

```
00208 WHEELA  LD A,(HL); GET TOOTH COUNT
00209         LD (STAT1),A; AND SAVE AS SCALE
00210         LD (HL),1; NEW TOOTH COUNTER
00211         LD (WHLSPD),DE; SAVE NEW SPEED
00212         POP HL        ; GET NEW COUNT
00213         LD (INSTIM), HL; SAVE
00214         LD A,0DDH     ; SPEED STATUS
00215         LD (COMMX),A
00216 WHEELB  POP BC
00217         POP DE
00218         POP HL
00219         POP AF
00220         EI
00221         RETI
00222 ;
00223 ; DIVIDE SUBROUTINE
00224 ; *******************
00225 ;
00226 ; DIVIDENT = 24 BITS CALCULATED FROM CONSTANT AND TOOTH
00227 ;            COUNT IN "STAT1" LOCATION
00228 ; DIVISOR  = 16 BITS IN REGISTER PAIR BC
00229 ; RESULT   = 16 BITS IN (DATA) AND (DATA+1) - MS BYTE
00230 ;
00231 ; DIVISOR IS MULTIPLIED BY VALUE IN (STAT1)
00232 ; (NUMBER OF TEETH FOR TIME IN WHLSPD)
00233 ; THEN DIVISION PROCEEDS
00234 ;
00235 DIVIDX  PUSH BC      ; SAVE DIVISOR
00236         LD DE,398FH  ; TWO LOWER BYTES
00237         LD A,(STAT1) ; GET TEETH COUNT
00238         LD B,A
00239         LD HL,0
00240         XOR A
00241 DIVIDA  ADD HL,DE
00242         ADC A,7      ; HIGHEST BYTE + CARRY
00243         DJNZ DIVIDA
00244         POP BC       ; GET DIVISOR
00245         PUSH HL      ; SAVE LOWER BYTES
00246         LD HL,0
00247         CALL DIVID1
00248         POP DE       ; GET LOWER BYTES
00249         PUSH DE
00250         LD A,D
00251         CALL DIVID1
00252         LD (DATA+1),A
00253         POP DE
00254         LD A,E
00255         CALL DIVID1
00256         LD (DATA),A
00257         RET
00258 ;
00259 DIVID1  EXX
00260         LD B,8
00261 DIVID3  EXX
00262         ADD A,A
00263         ADC HL,HL
00264         LD D,H
00265         LD E,L
00266         SBC HL,BC
00267         INC A
00268         JR NC,DIVID2
00269         DEC A
00270         EX DE,HL
00271 DIVID2  EXX
00272         DJNZ DIVID3;LOOP
00273         EXX
00274         RET
00275 ;
00276 ; VELOCITY REFERENCE SUBROUTINE
00277 ; *****************************
00278 ;
00279 ; ENTRY HERE IS VIA COUNTER INTERRUPT.
00280 ; REFERENCE IS A 24 BIT NUMBER, WHERE LS BYTE
```

```
00281 ; IS USED ONLY FOR SCALING. UPPER TWO BYTES ARE
00282 ; USED FOR REFERENCE. AMOUNT OF DECREMENTING
00283 ; DEPENDS ON SELECTOR SWITCH SETTING AND TIME
00284 ; BETWEEN INTERRUPTS (CONSTANT).
00285 ; DECREMENTING IS DISABLED WHEN "COMMY" IS 0DDH.
00286 ;
00287 REFUPX  PUSH AF
00288         LD A,(COMMY)
00289         CP 0DDH
00290         JR Z,REFUP1
00291         PUSH HL
00292         PUSH DE
00293         PUSH BC
00294         LD B,A
00295         LD A,(REFER-1); GET SCALE
00296         LD C,MEDDEC; DECEL RATE
00297         LD DE,0
00298         LD HL,(REFER)
00299         SUB C
00300         SBC HL,DE
00301         JR NC,REFUP2
00302         LD HL,0
00303 REFUP2  LD C,A
00304         LD A,B
00305         SUB 1
00306         LD A,C
00307         JR C,REFUP3; JUMP IF NO CHANGE (A=0)
00308         JR Z,REFUP4; JUMP IF REF INCR (A=1)
00309         SUB CONST; STAY IF DECREASE (A=2)
00310         SBC HL,DE; SUBTRACT CARRY IF ANY
00311         JR NC,REFUP3
00312         LD HL,0
00313         JR REFUP3
00314 REFUP4  ADD A,CONST
00315         ADC HL,DE; ADD CARRY IF ANY
00316 REFUP3  LD (REFER-1),A; SAVE NEW SCALER
00317         LD (REFER),HL; SAVE NEW REFERENCE
00318         LD A,0
00319         LD (COMMY),A
00320         POP BC
00321         POP DE
00322         POP HL
00323         LD A,0DDH
00324 REFUP1  LD (COMMZ),A; NEW REF STATUS
00325         POP AF
00326         EI
00327         RETI
00328 ;
00329 ; PORT SETUP ROUTINE
00330 ; ******************
00331 ;
00332 SETUP   IM 2 ; INTERRUPT MODE 2 (VECTOR)
00333 ;
00334 ; PORT 1A
00335 ;
00336         LD A,0FFH; MODE 3 OPERATION
00337         OUT (DECCNT),A
00338         LD A,0FFH; INPUT BITS (ALL INPUT)
00339         OUT (DECCNT),A
00340         LD HL,VECT5; VECTOR FOR WHEEL SPEED SUBROUTINE
00341         LD A,L
00342         OUT (DECCNT),A
00343         LD A,0B7H; INTERRUPT CONTROL (ENABLE INTERRUPTS,
00344 ;                   OR, HIGH, MASK FOLLOWS)
00345         OUT (DECCNT),A
00346         LD A,0FBH; INTERRUPT MASK (BIT 2 SELECTED)
00347         OUT (DECCNT),A
00348 ;
00349 ; PORT 1B
00350 ;
00351         LD A,0FFH; MODE 3 OPERATION
00352         OUT (ACTCNT),A
00353         LD A,0FFH; INPUT BITS (ALL INPUT)
```

```
00354            OUT (ACTCNT),A
00355            LD HL,VECT1; VECTOR FOR NO ROUTINE- RETURN
00356            LD A,L
00357            OUT (ACTCNT),A
00358            LD A,7H; INTERRUPT CONTROL (DISABLE INTERRUPTS)
00359            OUT (ACTCNT),A
00360 ;
00361 ; PORT 2 (CTC)
00362 ;
00363            LD HL,VECT1
00364            LD A,L
00365            OUT (CTC0),A
00366            LD A,57H; CONTROL FOR CTC0
00367            OUT (CTC0),A
00368            LD A,0; TIME CONSTANT FOR CTC0 (256)
00369            OUT (CTC0),A
00370 ;
00371            LD A,55H; CONTROL FOR CTC1
00372            OUT (CTC1),A
00373            LD A,0; TIME CONSTANT (256)
00374            OUT (CTC1),A
00375 ;
00376            LD A,55H; CONTROL FOR CTC2
00377            OUT (CTC2),A
00378            LD A,0
00379            OUT (CTC2),A
00380 ;
00381            LD A,0D7H; CONTROL FOR CTC3
00382            OUT (CTC3),A
00383            LD A,31H; CONSTANT FOR 80 X PER SEC REFERENCE UPDATE RATE
00384            OUT (CTC3),A
00385 ;
00386 ; PORT 3A (R-2R)
00387 ;
00388            LD A,0FFH; MODE 3 OPERATION
00389            OUT (ANALCT),A
00390            LD A,0; INPUT BITS (ALL OUTPUT)
00391            OUT (ANALCT),A
00392            LD HL,VECT1; VECTOR FOR NO ROUTINE- RETURN
00393            LD A,L
00394            OUT (ANALCT),A
00395            LD A,7; NO INTERRUPTS
00396            OUT (ANALCT),A
00397 ;
00398 ; PORT 3B (CONTROL)
00399 ;
00400            LD A,0FFH; MODE 3 OPERATION
00401            OUT (CONTCT),A
00402            LD A,8; INPUT BIT (FOR PARITY)
00403            OUT (CONTCT),A
00404            LD HL,VECT1; NO ROUTINE- RETURN
00405            LD A,L
00406            OUT (CONTCT),A
00407            LD A,7; NO INTERRUPTS
00408            OUT (CONTCT),A
00409 ;
00410 ; SET INITIAL VALUES TO PORTS
00411 ;
00412            LD A,0
00413            OUT (ANALOG),A
00414            OUT (CONTROL),A
00415            LD (CURRENT),A
00416 ;
00417            JP START
00418 ;
00419 ; INTERRUPT TABLE
00420 ; ****************
00421 ;
00422 INTAB      ORG 300H
00423 VECT1      WORD RETNX
00424 VECT2      WORD RETNX
00425 VECT3      WORD RETNX
00426 VECT4      WORD REFUPX
```

```
00427 VECTS    WORD WHEELSP
00428 J
00429 J DELAY 5 SECONDS
00430 J (TEMPORARY ROUTINE FOR TESTING PURPOSES)
00431 J
00432 DELAY    LD A,50
00433 DEL1     EX AF,AF
00434          LD A,223
00435          LD B,60
00436 DEL2     DEC A
00437          JR NZ,DEL2
00438          DJNZ DEL2
00439          EX AF,AF
00440          DEC A
00441          JR NZ,DEL1
00442          OUT (ANALOG),A
00443          JP START
00444 J
00445 J RAM
00446 J ***
00447 J
00448 RAM      EQU 800HJ  BEGINNING OF RAM
00449 STACK    EQU 8FFHJ  END OF RAM (RETURN STACK)
00450 COMMX    EQU 825HJ  STATUS OF WHEEL SPEED
00451 COMMY    EQU 823HJ  REFERENCE ENABLE BYTE
00452 COMMZ    EQU 802HJ  STATUS OF REFERENCE
00453 WHLSPD   EQU 80BHJ  COMBINED, FILTERED SPEED (TWO BYTES)
00454 STATUS   EQU 812HJ  STATUS FOR VEL. CONVERT (TWO BYTES)
00455 INSTIM   EQU 814HJ  FORMER COUNTER VALUE (TWO BYTES)
00456 DATA     EQU 81DHJ  ARITHMETIC RESULTS (TWO BYTES)
00457 REFER    EQU 821HJ  REFERENCE, THREE BYTES, FIRST IS REFER-1
00458 CURRENT  EQU 824HJ  VALVE CURRENT VALUE
00459 PRESPD   EQU 826HJ  PREVIOUS SPEED (TWO BYTES)
00460 STAT1    EQU 828HJ  TEMPORARY STORAGE FOR TOOTH COUNT
00461 J
00462 J PORTS
00463 J *****
00464 J
00465 DECSEL   EQU 60HJ   DECEL SELECTOR PORT, DATA
00466 DECCNT   EQU 61HJ   DECEL SELECTOR PORT, CONTROL
00467 ACFT     EQU 62HJ   AIRCRAFT CONTROLS PORT, DATA
00468 ACTCNT   EQU 63HJ   AIRCRAFT CONTROLS PORT, CONTROL
00469 CTC0     EQU 50HJ   CTC CIRCUIT, LOWEST BYTE
00470 CTC1     EQU 51HJ   CTC CIRCUIT, 2 ND BYTE
00471 CTC2     EQU 52HJ   CTC CIRCUIT, 3 RD BYTE
00472 CTC3     EQU 53HJ   CTC CIRCUIT, HIGHEST BYTE
00473 ANALOG   EQU 30HJ   R-2R PORT, DATA
00474 ANALCT   EQU 31HJ   R-2R PORT, CONTROL
00475 CONTROL  EQU 32HJ   SYSTEM CONTROL PORT, DATA
00476 CONTCT   EQU 33HJ   SYSTEM CONTROL PORT, CONTROL
00477 J
00478 J GENERAL CONSTANTS
00479 J ******************
00480 J
00481 COMPEN   EQU 8J     COMPENS FOR TIME BETWEEN READINGS OF CTC0 AND CTC1
00482 TEETH    EQU 4J     NUMBER OF TEETH PER MEASUREMENT
00483 MINDEC   EQU 3BHJ   MINIMUM DECEL CONSTANT
00484 MEDDEC   EQU 76HJ   MEDIUM DECEL CONSTANT
00485 KTS1     EQU 0AHJ   1 KTS VELOCITY
00486 KTS80    EQU 800J   80 KTS WHEEL SPEED
00487 FILLCUR  EQU 0FFHJ  CURRENT VALUE FOR FILL SPIKE
00488 FILLTIM  EQU 4HJ    TIME DURATION FOR FILL SPIKE
00489 CONCT    EQU A5HJ   CONSTANT FOR LOOP GAIN ADJ.
00490 SPD1     EQU 1000HJ SPEED SCALE
00491 J
00492          END BEG
```

I claim:

1. In an automatic braking brake control system for a vehicle having a wheel, means for generating a wheel signal indicative of rotational movement of the wheel, and means for automatically initiating braking action of a wheel brake following generation of a control signal, the improvement comprising:

means, responsive to the wheel signal, for generating a first signal indicative of acceleration of the wheel;

means, responsive to the first signal, for generating a control signal when the first signal crosses a threshold indicative of low wheel acceleration during a period of initial wheel spin-up; and means for supplying the control signal to the initiating means as an indication of the substantial completion of initial wheel spin-up in order to cause the initiating means to initiate braking action.

2. The invention of claim 1 further including means for disabling the means for generating a control signal when the speed of the braked wheel is less than a predetermined value.

3. The invention of claim 2 wherein the vehicle is an aircraft and the predetermined value is about 20 knots less than the minimum landing speed of the aircraft.

4. In an automatic braking brake control system for an aircraft having a wheel, means for generating a wheel speed signal indicative of rotational speed of the wheel, and means for automatically initiating braking action of a wheel brake coupled to the wheel following generation of a control signal at the start of a landing, the improvement comprising:

means for generating a first signal indicative of the rate of change of the wheel speed signal during a period of wheel spin-up prior to initiation of braking action at the start of a landing;

means, responsive to the first signal, for generating a control signal when the first signal crosses a threshold indicative of low rate of change of the wheel speed signal; and means for supplying the control signal to the initiating means as an indication of the substantial completion of wheel spin-up in order to cause the initiating means to initiate braking action at the start of the landing.

5. The invention of claim 4 further including means for disabling the means for generating a control signal when the wheel speed signal is indicative of a wheel speed below a predetermined value.

6. The invention of claim 5 wherein the predetermined value is about 20 knots less than the minimum landing speed of the aircraft.

7. In an automatic braking brake control system for a vehicle having a wheel, means for generating a wheel speed signal indicative of rotational speed of the wheel, and means for automatically initiating braking action of a wheel brake coupled to the wheel following generation of a control signal, the improvement comprising:

means for storing a first value of the wheel speed signal indicative of wheel speed at a first time;

means for comparing the stored first value to a second value of the wheel speed signal, indicative of wheel speed at a second time, subsequent to the first time, to generate a first signal indicative of the difference between the first value and the second value;

means for generating a control signal when the first signal crosses a threshold indicative of a low rate of change of the wheel speed signal during a period of initial wheel spinup prior to initiation of braking action; and means for supplying the control signal to the initiating means as an indication of the substantial completion of initial wheel spin-up in order to cause the initiating means to initiate braking action.

8. The invention of claim 7 further including means for disabling the means for generating a control signal when the wheel speed signal is indicative of a wheel speed below a predetermined value.

9. The invention of claim 8 wherein the vehicle is an aircraft and the predetermined value is about 20 knots less than the minimum landing speed of the aircraft.

10. In an automatic braking system for an aircraft having a wheel, means for generating a wheel speed signal indicative of rotational speed of the wheel, and means for automatically initiating braking action of a wheel brake at the start of a landing following generation of a control signal, the improvement comprising:

means for storing a first value of the wheel speed signal indicative of wheel speed at a first time;

means for storing a second value of the wheel speed signal indicative of wheel speed at a second time subsequent to the first time;

means for generating a control signal when the second value is no greater than the first value during a period of initial wheel spin-up prior to initiation of braking action; and means for supplying the control signal to the initiating means as an indication of the substantial completion of wheel spin-up in order to cause the initiating means to initiate braking action at the start of a landing.

11. In an automatic braking system for an aircraft having a wheel, means for generating a wheel speed signal indicative of rotational speed of the wheel, and means for automatically initiating braking action of a wheel brake following generation of a control signal at the start of a landing, the improvement comprising:

means for storing a first value of the wheel speed signal indicative of wheel speed at a first time;

means for storing a second value of the wheel speed signal indicative of wheel speed at a second time subsequent to the first time;

means for storing a third value of the wheel speed signal indicative of wheel speed at a third time, subsequent to the second time;

means for generating a control signal when the second value is no greater than the first value and the third value is no greater than the first value during a period of initial wheel spin-up prior to initiation of braking action; and means for supplying the control signal to the initiating means as an indication of the substantial completion of wheel spin-up in order to cause the initiating means to initiate braking action at the start of a landing.

12. The invention of claim 10 or 11 further including means for disabling the means for generating a control signal when the wheel speed signal is indicative of a wheel speed less than a predetermined value.

13. The invention of claim 12 wherein the predetermined value is about 20 knots less than the minimum landing speed of the aircraft.

* * * * *

UNITED STATES PATENT AND TRADEMARK OFFICE
CERTIFICATE OF CORRECTION

PATENT NO. : 4,425,621
DATED : January 10, 1984
INVENTOR(S) : Thomas Skarvada

It is certified that error appears in the above-identified patent and that said Letters Patent is hereby corrected as shown below:

IN THE PATENT SPECIFICATION

Column 1, line 33, please delete "spun-up" and substitute therefor --spin-up--;

Column 3, line 40, please delete "increases" and substitute therefor --includes--;

Signed and Sealed this

Tenth Day of December 1985

[SEAL]

Attest:

DONALD J. QUIGG

Attesting Officer

Commissioner of Patents and Trademarks